(No Model.)
H. W. BELDSMEIER.
Excavator.
No. 233,316.    Patented Oct, 19, 1880.
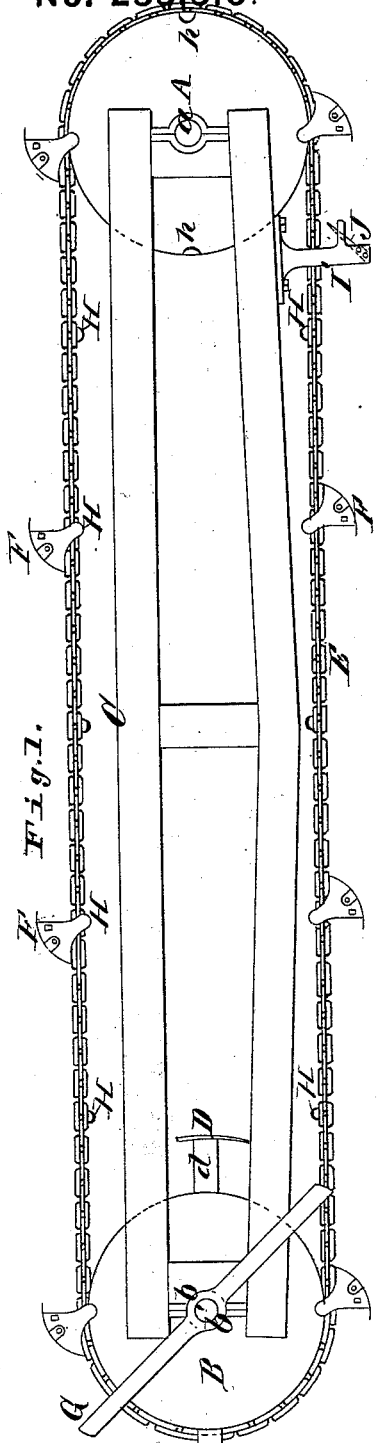
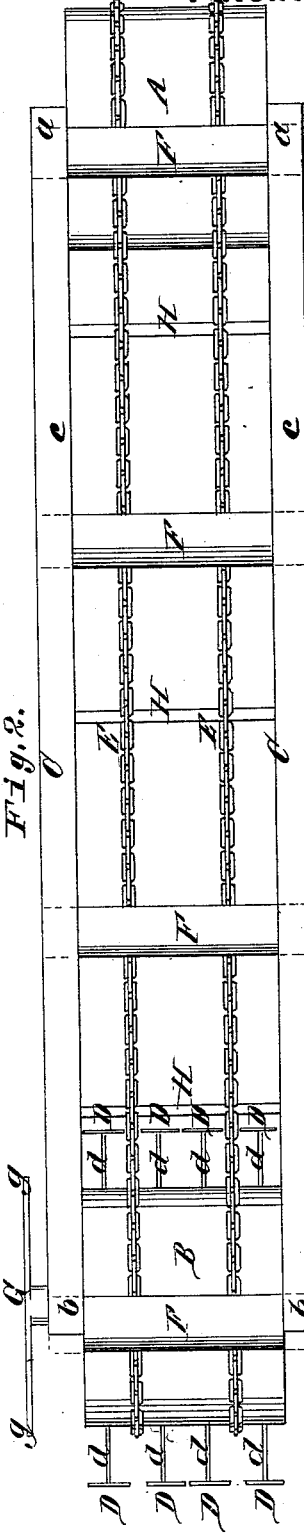
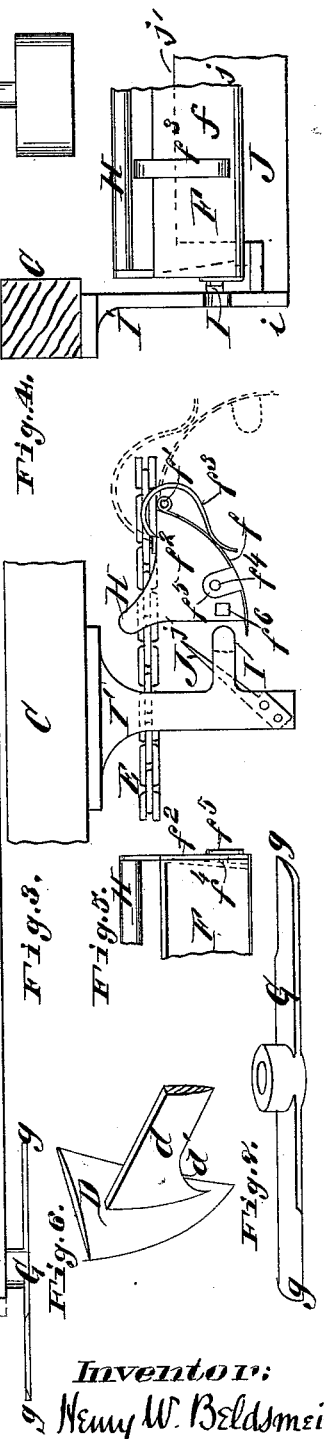
Attest:
Charles Pickles,
W. L. Crowson.
Inventor:
Henry W. Beldsmeier,
by C. D. Moody,
atty.

United States Patent Office.

HENRY W. BELDSMEIER, OF ST. LOUIS, MISSOURI, ASSIGNOR TO JOHANNA W. BELDSMEIER, OF SAME PLACE.

EXCAVATOR.

SPECIFICATION forming part of Letters Patent No. 233,316, dated October 19, 1880.

Application filed July 31, 1880. (No model.)

*To all whom it may concern:*

Be it known that I, HENRY W. BELDSMEIER, of St. Louis, Missouri, have made a new and useful Improvement in Excavators, of which the following is a full, clear, and exact description, reference being had to the annexed drawings, making part of this specification, in which—

Figure 1 is a side elevation of the improvement; Fig. 2, a front elevation; Fig. 3, a detail, being a side elevation of a portion of the upper end of the excavator-frame, and showing, also, a bucket; Fig. 4, a front elevation of the parts last named; Fig. 5, a detail, being an inner view of the end of one of the buckets; Fig. 6, a perspective view of one of the picks, and Fig. 7 a perspective view of one of the side knives.

The same letters denote the same parts.

The invention in question is an improvement in machines for excavating and elevating earth.

The improvement has relation, mainly, to the combination of a system of rotating picks, which loosen the earth to be excavated, and a series of traveling shovel-buckets, which take up the loosened earth and elevate it to the desired point, the picks and shovels being held and operated by means of a construction similar to an elevator-leg, that can be raised and lowered and swung to and fro to enable the earth to be loosened at, and elevated from, various points. The means for thus holding and moving the leg are not shown, as their nature can be readily understood.

Referring to the drawings, A and B represent pulleys or drums held in a leg, C, and respectively in the upper and lower ends thereof, the drum A turning in the bearing $a$ and the drum B in the bearing $b$. The lower drum, B, is provided with picks D D D—that is, the drum-shaft $b'$ is furnished with arms $d\, d\, d$, which extend outward beyond the face of the drum, and at their outer ends furnished with implements resembling a pick, the preferable shape of which is shown more distinctly in Fig. 6, the blade of the pick being curved and of the triangular shape shown, and the front edge, $d'$, of the arm $d$ being sharpened and curved around to meet the point of the pick-blade.

The picks are spaced sufficiently apart to provide for the passing of the chains or ropes E E around the drum B. The ropes or chains E E extend around the drums A and B, and are furnished with a series of bucket-shovels, F F F, which are attached to and move with the chains. The shovels are shaped suitably to scoop up the earth and to elevate it after the manner of an elevator-bucket. They are also properly spaced apart on the chains (and the other portions of the device also properly made) to enable them to be carried around the drum B without conflicting with the rotation of the picks. To prevent the chains from slipping on the drums the latter are notched, grooved, or lagged at $h\, h$, thereby forming shoulders, against which the arms or projections H H (with which the chains are furnished) connect as the chains are carried around the drums.

G G represent knives, fastened to the shaft $b'$ and rotating with it, the lengths of said knives being extended so as to bring their points $g\, g$ even with, or at the same distance from, the shaft $b'$ as the pick-blades.

In operation, the frame C is let down after the manner of an elevator-leg, bringing the lower end of the device against the earth to be excavated. The lower drum, B, and the chains E E are then, and by any suitable mechanism, set in motion, the drum B rotating on the bearing $b$, and the chains bearing the shovels being carried around the drums, as indicated by the arrows. A convenient mode of effecting these movements is as follows: Let the upper drum, A, by any suitable means, be caused to rotate on the bearings $a\, a$. This, by means of the shoulders $h'$ and arms H, causes the chains and lower drum to move as desired. The picks loosen the earth, the knives G G cut and loosen the earth at the extreme sides of the excavation, and the shovels take and elevate the earth to the upper end of the device, where it is discharged from the shovels. It is not always necessary to use the knives G G, and they are made detachable from the shaft $b'$. As shown, the picks rotate in the same direction with the shovels.

The drums in the drawings are shown closed on their faces; but they can be made in a skeleton form, as their main office is to serve as pulleys for the chains to pass around, and as a suitable frame for supporting the picks.

To thoroughly empty the shovels, and to scrape off therefrom any dirt that otherwise would adhere thereto when the shovels are upturned, the following mechanism may be employed: The backs $f\,f$ of the shovels are hinged at $f'$, and are upheld against the sides $f^2\,f^2$ of the shovels by means of a spring, $f^3$, and fastened thereto by means of studs $f^4$, upon the sides $f^2\,f^2$, engaging in perforated clips $f^5$, that are upon the backs $f\,f$. As the shovels are carried downward from the top of the frame C beveled projections $f^6$ upon the shovel sides $f^2$ encounter beveled stops I, that are upon the brackets I', that are, respectively, upon each side $c\,c$ of the leg C. The sides $f^2$ are of thin steel, and are sprung inward sufficiently, as indicated by the dotted lines in Figs. 4, 5, to disengage the studs $f^4\,f^4$ from the clips $f^5\,f^5$. This leaves the backs $f$ free to be pressed and turned on the hinges $f'\,f'$.

J represents a scraper, of the shape indicated in Figs. 3, 4, fastened to the brackets I' at the points $i$. The projecting portion $j$ of the scraper, in length, is shorter than the distance between the sides $f^2\,f^2$ of the buckets when sprung inward toward each other, as above described, and it is shaped and arranged so that, as the buckets are moved along the backs $f\,f$ successively encounter the edge $j'$ of the scraper J. This causes the backs $f\,f$ to turn on the hinges, as indicated in Fig. 3, and in passing the scraper the earth adhering to the backs $f\,f$ is scraped therefrom. The buckets pass between the scraper and the main portion of the leg C, and as soon as the scraper is passed the spring $f^3$ acts to close the back $f$ up to the sides $f^2\,f^2$ again.

The shovels can be lengthened, as indicated by the dotted lines in Fig. 2.

I am aware that excavators have heretofore been furnished with buckets and picks, and I therefore do not claim such, broadly; but

I claim—

1. The herein-described excavator, consisting of the vertically-adjustable and oscillating leg C, drums A and B, the latter having the picks D D D, the chains E E, and the shovel-buckets F F, combined and operating substantially as described.

2. The combination of the vertically-adjustable and oscillating leg C, drums A and B, picks D D D, chains E E, and buckets F F F, the latter, when discharging, encountering the scraper J, substantially as described.

3. The combination of the leg C, drums A B, grooved at $h\,h\,h$, picks D D D, chains E E, having the projections H H, and the buckets F F F, substantially as described.

4. The combination of the frame C, drums A B, chains E E, scraper J, and shovel-buckets F F F, said shovel-buckets having the backs $f\,f\,f$ hinged and opening away from the sides $f^2\,f^2$ when against said scraper, substantially as described.

5. The combination of the chains E E, shovels F F, having the hinged backs $f\,f$, sides $f^2\,f^2$, spring $f^3$, studs $f^4\,f^4$, clips $f^5\,f^5$, projections $f^6\,f^6$, stops I I, scraper J, and frame C, substantially as described.

H. W. BELDSMEIER.

Witnesses:
CHAS. D. MOODY,
CHARLES PICKLES.